(12) United States Patent
Hutchison et al.

(10) Patent No.: US 6,800,832 B2
(45) Date of Patent: Oct. 5, 2004

(54) METHOD AND APPARATUS FOR WELDING

(75) Inventors: Richard Hutchison, New London, WI (US); Todd Holverson, Appleton, WI (US); James Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 67 days.

(21) Appl. No.: 10/262,354

(22) Filed: Sep. 30, 2002

(65) Prior Publication Data

US 2003/0085210 A1 May 8, 2003

Related U.S. Application Data

(63) Continuation of application No. 10/012,788, filed on Nov. 5, 2001, which is a continuation of application No. 09/526,770, filed on Mar. 16, 2000, now Pat. No. 6,326,591, which is a continuation of application No. 09/024,944, filed on Feb. 17, 1998, now Pat. No. 6,087,626.

(51) Int. Cl.$^7$ .............................................. B23K 9/095
(52) U.S. Cl. ................................................ 219/130.21
(58) Field of Search ...................... 219/130.21, 130.01, 219/130.33, 130.51, 137.71, 137 PS

(56) References Cited

U.S. PATENT DOCUMENTS

| | | | |
|---|---|---|---|
| 3,242,312 A | 3/1966 | Pierce | |
| 3,253,119 A | 5/1966 | Manz | |
| 3,423,564 A | 1/1969 | Sevenco | |
| 3,459,920 A | 8/1969 | Sevenco | |
| 3,627,975 A | 12/1971 | Goto | |
| 3,711,058 A | 1/1973 | Weman | |
| 3,730,136 A | 5/1973 | Okada | |
| 3,731,049 A | 5/1973 | Kiyohara et al. | |
| 3,739,139 A | 6/1973 | Weman | |
| 3,770,932 A | 11/1973 | Cotter et al. | |

(List continued on next page.)

FOREIGN PATENT DOCUMENTS

| | | |
|---|---|---|
| EP | 0441337 B1 | 3/1996 |
| GB | 2219154 A | 11/1989 |
| JP | 8-80095 | 6/1994 |
| JP | 8-84445 | 9/1994 |
| SU | 1836583 A3 | 8/1993 |
| WO | WO96/09679 | 3/1996 |
| WO | WO96/30155 | 10/1996 |

OTHER PUBLICATIONS

Stabilisation of transfer and methods of reducing the Spattering of metal in $CO_2$ with a short arc., I.S. Pinchuk, et al. Welding Production 1980, vol. 27, No. 6

*Primary Examiner*—Clifford C. Shaw
(74) *Attorney, Agent, or Firm*—George R. Corrigan

(57) ABSTRACT

A short circuit arc welding system is disclosed. The control scheme uses a current command signal to drive the output current. The command signal is comprised of a long-term current command that sets the long-term current command level and a real-time or short-by-short current command. Arc voltage feedback is used to determine if the desired arc length is present and to adjust the long-term command. The short-by-short current command is derived from real-time arc current feedback and is used to control the burn-off rate by an instantaneous, or short-by-short, adjustment of the current command. A function of the time derivative of arc power, less the time derivative of arc current, is used to detect, in real time, when the short is about to clear. A stop algorithm is employed that monitors the arc on a short-by-short basis. When the process is ending a very low current level is provided to avoid forming a ball. However, if a short is created, (indicated by a drop in arc voltage) after the low current level, a burst of energy is provided to clear of burn off the short. After the short is cleared, very low current is again provided to avoid forming a large ball. This is repeated until the wire stops and the process ends.

48 Claims, 10 Drawing Sheets

U.S. PATENT DOCUMENTS

| | | | |
|---|---|---|---|
| 3,775,585 A | 11/1973 | Okada | |
| 3,781,640 A | 12/1973 | Toth | |
| 3,792,225 A | 2/1974 | Needham et al. | |
| 3,809,853 A | 5/1974 | Manz | |
| 3,813,594 A | 5/1974 | Toth | |
| 3,832,523 A | 8/1974 | Kitani et al. | |
| 3,835,287 A | 9/1974 | Jonsson | |
| 3,895,212 A | 7/1975 | Maxwell et al. | |
| 3,899,652 A | 8/1975 | Terry et al. | |
| 3,961,154 A | 6/1976 | Ericsson | |
| 3,968,340 A | 7/1976 | Fernicola | |
| 3,978,311 A | 8/1976 | Toth | |
| 3,995,137 A | 11/1976 | Okada | |
| 4,000,374 A | 12/1976 | Keyser | |
| 4,020,320 A | 4/1977 | Pijls | |
| RE29,400 E | 9/1977 | Ericsson | |
| 4,101,755 A | 7/1978 | Uratani | |
| 4,125,759 A | 11/1978 | Kiyohara | |
| 4,152,759 A | 5/1979 | Hedberg | |
| 4,159,409 A | 6/1979 | Hedberg | |
| 4,213,084 A | 7/1980 | Hiromitsu | |
| 4,273,985 A | 6/1981 | Paton et al. | |
| 4,282,569 A | 8/1981 | Hardwick et al. | |
| 4,310,744 A | 1/1982 | Okada | |
| 4,328,458 A | 5/1982 | Hiromitsu | |
| 4,415,793 A | 11/1983 | Podola et al. | |
| 4,415,874 A | 11/1983 | Messe et al. | |
| 4,425,493 A | 1/1984 | Mizuno et al. | |
| 4,453,150 A | 6/1984 | Messe et al. | |
| 4,465,920 A | 8/1984 | Hoyt, Jr. et al. | |
| 4,469,933 A | 9/1984 | Mizuno et al. | |
| 4,482,797 A | 11/1984 | Shiramizu et al. | |
| 4,485,293 A | 11/1984 | Tabata et al. | |
| 4,533,817 A | 8/1985 | Makimaa | |
| 4,544,826 A | 10/1985 | Nakanishi et al. | |
| 4,546,234 A | 10/1985 | Ogasawara et al. | |
| 4,631,385 A * | 12/1986 | Rothermel | 219/137.71 |
| 4,647,754 A | 3/1987 | Hirasawa | |
| 4,665,299 A | 5/1987 | Iwata | |
| 4,717,807 A | 1/1988 | Parks et al. | |
| 4,728,173 A | 3/1988 | Toth | |
| 4,769,754 A | 9/1988 | Reynolds et al. | |
| 4,794,232 A | 12/1988 | Kimbrough et al. | |
| 4,866,247 A | 9/1989 | Parks et al. | |
| 4,870,248 A | 9/1989 | Gilliland | |
| 4,889,969 A | 12/1989 | Kawi et al. | |
| 4,897,523 A | 1/1990 | Parks et al. | |
| 4,914,373 A | 4/1990 | Rivkine | |
| 4,954,691 A | 9/1990 | Parks et al. | |
| 4,972,064 A | 11/1990 | Stava | |
| 4,994,646 A | 2/1991 | Tabata et al. | |
| 5,001,326 A * | 3/1991 | Stava | 219/130.21 |
| 5,003,154 A | 3/1991 | Parks et al. | |
| 5,017,757 A | 5/1991 | Kawai et al. | |
| 5,055,815 A | 10/1991 | Yamamoto et al. | |
| 5,101,092 A | 3/1992 | Baurle et al. | |
| 5,148,001 A | 9/1992 | Stava | |
| 5,239,154 A | 8/1993 | Puls | |
| 5,250,786 A | 10/1993 | Kikuchi et al. | |
| 5,270,516 A * | 12/1993 | Hamamoto et al. | 219/130.21 |
| 5,281,791 A | 1/1994 | Tabata et al. | |
| 5,315,222 A | 5/1994 | Kasagami et al. | |
| 5,338,916 A | 8/1994 | Blankenship et al. | |
| 5,349,157 A | 9/1994 | Blankenship | |
| 5,351,175 A | 9/1994 | Blankenship | |
| 5,408,067 A | 4/1995 | Crouse | |
| 5,432,317 A | 7/1995 | Church | |
| 5,436,509 A | 7/1995 | Migdal | |
| 5,444,214 A | 8/1995 | Crouse et al. | |
| 5,495,091 A | 2/1996 | Tabata et al. | |
| 5,581,168 A | 12/1996 | Rozman et al. | |
| 5,726,419 A | 3/1998 | Tabata et al. | |
| 5,824,991 A | 10/1998 | Mita et al. | |
| 6,025,573 A | 2/2000 | Stava | |
| 6,051,807 A | 4/2000 | Ogasawara et al. | |
| 6,051,810 A | 4/2000 | Stava | |
| 6,087,626 A | 7/2000 | Hutchison et al. | |
| 6,326,591 B1 | 12/2001 | Hutchinson et al. | |

* cited by examiner

METHOD AND APPARATUS FOR WELDING

This is a continuation of, and claims the benefit of the filing date of, U.S. patent application Ser. No. 10/012,788, filed Nov. 5, 2001, entitled Method And Apparatus For Short Arc Welding, which is a continuation of application Ser. No. 09/526,770, filed Mar. 16, 2000, entitled Method and Apparatus for Short Arc Welding, which issued as U.S. Pat. No. 6,326,591, which is a continuation of application Ser. No. 09/024,944 filed on Feb. 17, 1998, which issued as U.S. Pat. No. 6,087,626.

FIELD OF THE INVENTION

The present invention relates generally to the art of welding power supplies. More specifically, it relates to welding power supplies and the control thereof for short circuit welding.

BACKGROUND OF THE INVENTION

There are many types of welding power supplies and welding processes. One welding process is referred to as short circuit transfer welding. Short circuit transfer welding generally consists of alternating between an arc state and a short circuit, non-arc state. During the arc state the wire melts, and during the short circuit state the metal further melts and the molten metal is transferred from the end of the wire to the weld puddle. The metal transferred in one cycle is referred to herein as a drop, regardless of the size or shape of the portion of metal that is transferred.

Short circuit transfer welding has many advantages, such as shorter arc length and less melting of the base plate. However, short circuit transfer welding has disadvantages, such as increased spatter.

Both the power source topology and the control scheme must be considered when designing a shore circuit transfer welding power source. The power topology used must be fast enough to have a timely response to the chosen control scheme. The control should address three considerations: First, arc length must be properly controlled. Second, the burn-off (or mass deposition) rate must be appropriately controlled. Inappropriate burn-off rate will result in increased spatter. Third, spatter is also caused by too much power when the short is cleared, i.e., the transition from a short circuit to an arc. Thus, the power or current when the short clears must also be controlled. Also, when the short is about to clear must be detected. Some prior art patents do not teach control of the short circuit transfer welding process on a short circuit by short circuit basis. Such a control will provide more precise control of the welding process and will help to reduce spatter.

One common prior art power source topology uses secondary switchers to control the output. While these may provide fast control, they may be relatively expensive or have insufficient peak current capacity. Also, switching high current may increase reliability problems and switching losses. Examples of patents that have secondary switchers include: U.S. Pat. No. 4,469,933, entitled Consumable Electrode Type Arc Welding Power Source, issued Sep. 4, 1984; U.S. Pat. No. 4,485,293, entitled Short Circuit Transfer Arc Welding Machine, issued Nov. 27, 1984; U.S. Pat. No. 4,544,826 entitled Method and Device For Controlling Welding Power Supply to Avoid Spattering of the Weld Material, issued Oct. 1, 1985; U.S. Pat. No. 4,717,807, entitled Method and Device For Controlling a Short Circuiting Type Welding System, issued Jan. 5, 1988.

The control scheme in many prior art power supplies uses arc voltage to determine if arc length is proper. Typically, if the arc voltage is less than a setpoint, the arc length is determined to be too short, and if the arc voltage is greater than the setpoint, arc length is determined to be too long. The output current is controlled to either increase or decrease the amount of metal being transferred, thus controlling the arc length. Some prior art short circuit transfer welding patents taught control of the mass deposition (burn-off) rate by controlling the welding power by "totalizing" the energy delivered to the arc. Arc or welding power is a function of arc current and arc voltage.

However, the burn-off rate on a short-by-short basis (i.e. for any given short circuit transfer welding cycle) is largely independent of arc voltage—it is predominantly a function of arc current. Thus, prior art control schemes that use arc power (or arc energy) to control the burn-off rate are complex, and inaccurate. Example of such complex and inaccurate control schemes include: U.S. Pat. No. 4,866,247, entitled Apparatus and Method of Short Circuiting Arc Welding, issued on Sep. 12, 1989; U.S. Pat. No. 4,897,523, entitled Apparatus and Method of Short Circuiting Arc Welding, issued on Jan. 30, 1990; U.S. Pat. No. 4,954,691, entitled Method and Device For Controlling A Short Circuit Type Welding System, issued on Sep. 4, 1990; and U.S. Pat. No. 5,003,154 entitled Apparatus and Method of Short Circuiting Arc Welding, issued on Mar. 26, 1991. Some of these prior art patents teach control of the power when a short is clearing by predicting the clearing of the short. They generally compare arc voltage or its first derivative to a threshold. However, the prior art attempts result in missed or false positive short clearing predictions.

Accordingly, a short circuit transfer welding power supply that adequately controls the burn-off rate, preferably on a short-by-short basis, is desired. Preferably, the process should be controlled such that power is reduced when the short is clearing. Also, the power source used should be sufficiently fast to respond to the control, but not unduly expensive or limited in peak output current.

One of the causes of instability in a short circuit transfer welding process relates to excessive pre-heating of the wire. Variations in the wire/puddle interaction caused by operator movement and/or changing puddle geometry, can result in irregular pre-heating of the wire due to $I^2 \ast R$ heat generation. Too much pre-heating of the wire can cause the melting rate of the wire to increase to a point where the molten ball grows very quickly following the transition from a short to an arc. This quick melting, known as a flare-up, results in a rapid increase in arc length with a corresponding voltage increase.

The opposite extreme can also occur. If there is insufficient pre-heating of the wire, the short circuit frequency will increase as subsequent arc times become shorter. If energy is not added quickly enough, the wire can eventually "stub" into the puddle. The end result of such stubbing is either an explosive short clearing, or a sustained short circuit with no arc (sometimes called noodle welding). Over and under preheating often occur in a cyclic fashion. Unfortunately, most prior art controls adjust after a stub or flare-up has occurred. For example, when the control causes the heat to decrease to compensate for past pre-heating, the process has already cycled to the under-heating stage. Thus, the control actually exacerbates the problem. Accordingly, it is desirable to have a short circuit transfer welding process that accurately compensates for the pre-heating of the wire.

It is desirable to have consistent arc starting in most welding processes. The size of the ball at the end of the wire (formed when the last weld was terminated) is a significant factor in determining the amount of energy needed to initiate the arc. Thus, tile condition of the end of the wire (size of the ball) from the previous weld should be consistent to provide consistent arc starting.

However, the size of the ball can vary from 1 to 3 times the diameter of the wire after a typical short circuit transfer welding process has ended. Previously, sometimes an operator cut the end of the wire, which eliminated the ball, or in some prior robotic arc spray systems an extra step to dress or trim the wire at the end of each weld and to insure the wire isn't frozen to the welded joint at arc end is provided (U.S. Pat. No. 5,412,175 issued May 2, 1995, e.g.). While this may produce a uniform wire diameter at the start of the next weld, it wastes time, and the extra step would not be needed if the wire had a consistent diameter when each weld is stopped.

There have been attempts in the prior art to control the termination of a welding process. A BETA-MIG® has used a predetermined "crater" for the stops. However, the BETA-MIG® did not provide a fast enough response, or an adequate control scheme, to produce the consistent ball size desired for short circuit transfer welding.

Another prior art system is in the Miller 60M® pulsed spray process, which has an algorithm that reduces the output pulse frequency to match the stopping of the motor. A final pulse is sent which blows one last ball off the wire and extinguishes the arc. However, this method will not work for processes such as short circuit transfer welding, that do not tightly control the frequency of the output power. Also this prior art does not desirably compensate for irregularities in the process, such as unintended shorts.

Accordingly, a power source and controller that provide a stop algorithm that reduces the size of the ball to be about that of the wire diameter, or of a size that allows consistent starts to be made, i.e. not a large ball, when the process is terminated, is desirable. This process will, preferably, insure that the wire is not frozen to the weld joint at arc end. Also, the stop algorithm should preferably be robust (i.e. able to function even during irregularities in the process) and adaptable for a variety of processes, such as MIG processes, spray processes, pulsed spray processes, or short circuit transfer processes.

SUMMARY OF THE PRESENT INVENTION

According to a first aspect of the invention, a welding process and apparatus includes depositing drops of molten metal at the end of a welding wire into a weld puddle. A power source has a current output in electrical communication with the welding wire. A feedback circuit provides a real-time signal indicative of the heat input to each drop. A controller is coupled to the power source and has a feedback input coupled to the feedback circuit. It controls the magnitude of the current provided to the welding wire in response to the heat of each drop.

One aspect of the invention is that the feedback includes a current signal representative of the output, and the controller determines the power delivered to the wire. The controller also determines when the short is about to clear in response to the power delivered. The controller may determine a rate of change of the output power.

Another aspect is that the controller determines a value $V_c$ defined by $V_c = k*(dP/dt)$, where $V_c$ is a calculated value, k is a scalar, and dP/dt is the derivative of the power. The controller compares $V_c$ to a threshold. The controller subtracts a value responsive to the rate of change of the output current from the rate of change of the output power, in another embodiment.

The controller takes the derivative of a value responsive to the rate of change of the output power less the value responsive to the rate of change of the output current, in another embodiment. Also, the controller determines a value $V_c$ defined by $V_c = d/dt(k1*dP/dt - k2*di/dt)$, wherein k1 is a scalar, dP/dt is the derivative of the output power, k2 is a scalar, and di/dt is the derivative of the output current.

The controller provides a desired mass deposition rate responsive to a wire feed speed and a distance from a tip of the wire to the workpiece, in another alternative.

The controller compares a value responsive to the energy needed to deposit a given amount of wire to a value representing the amount of energy delivered in at least a portion of one welding cycle, in another embodiment. The controller determines the energy needed in accordance with $Q_{req} = k3*(R_{dep}*(H_m + (T_{drop} - T_{amb})*C_p)*t_{tot})$, where $Q_{req}$ is the energy needed, k3 is a scalar, $R_{dep}$ is a wire mass deposition rate, $H_m$ is a latent heat of melting for the wire, $T_{drop}$ is the temperature of the molten drop, $T_{amb}$ is the ambient temperature of the wire, $C_p$ is the heat capacity of the wire, and $t_{tot}$ is a cycle length. The controller determines the energy delivered in accordance with $Q_{wire} = ((V_{anode} + WF + 3kT/2e)*I + I^2*l*rho/A)$, where $Q_{wire}$ is the energy delivered, $V_{anode}$ is the anode voltage drop, WF is the work function of the metal comprising the wire, (3kT/2e) is the thermal energy of electrons impinging on the wire, I is the output current, l is the contact tip to arc distance, rho is the resistivity of the wire, and A is the cross sectional area of the wire.

The controller determines a length of stick out (i.e., the length of the wire that extends from the contact tip), in another embodiment. Stick out is determined by providing an arc voltage setpoint, and comparing the arc voltage setpoint to the arc voltage. Then the comparison is integrated over time. The intergrand is summed with an integrated burn rate error, and the sum is compared to known values.

Another embodiment includes stopping the welding process. The status of the arc is monitored, and the current is increased in response to the forming of a short circuit. Then, the current is driven to a low current level when the short has cleared, such that a large ball at the end of the wire is not formed. This is repeated until a short does not occur and the wire stops.

Another embodiment provides that the wire feed speed is monitored, and the stopping of the process begins when the wire feed speed drops below a threshold. In various embodiments the welding process is a MIG, spray, pulse spray, globular or short circuit transfer welding process. In other embodiments the arc is monitored by monitoring the arc voltage.

Other principal features and advantages of the invention will become apparent to those skilled in the art upon review of the following drawings, the detailed description and the appended claims.

Figure 1:
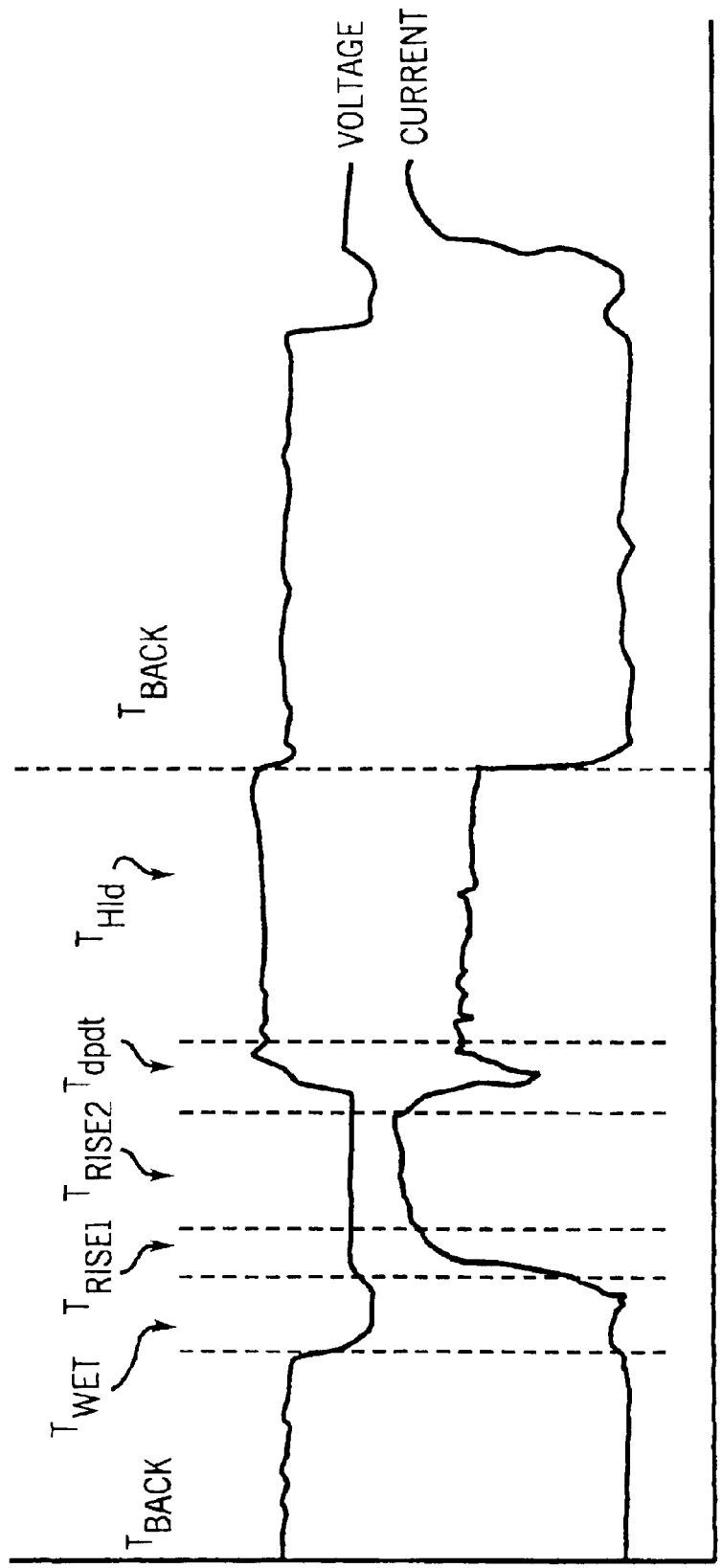
FIG. 1 is a graph showing current and voltage outputs for a short circuit transfer welding cycle.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred control scheme, a preferred control circuit, a preferred power source and illustrative waveforms, it should be understood at the outset that the invention is not limited to the components described herein. Other circuitry and control schemes may be employed while implementing this invention.

A method and apparatus for controlling a short circuit (MIG) welding process is described herein. A wire electrode is mechanically fed into the weldment at a relatively constant rate by a wire feeder in the short circuit transfer welding process. It is consumed into the weldment via a series of alternating short circuit and arc events. This process is generally referred to as short circuit welding, or short circuit transfer welding. Generally, a welding machine used for short circuit welding includes at least a power source, a controller and a wire feeder.

The short circuit transfer welding process is cyclical. One cycle of the process, as described herein, begins with the beginning of a steady state arc, followed by a short circuit condition, and is completed with the beginning of another steady state arc condition. A typical cycle length is 10 msec. The electrode and a portion of the base metal, are melted during the short circuit transfer welding process by current flowing through the electrode to the weldment. Generally, a portion of the wire material melts during the arc condition, and is transferred during the short condition.

Figure 8:
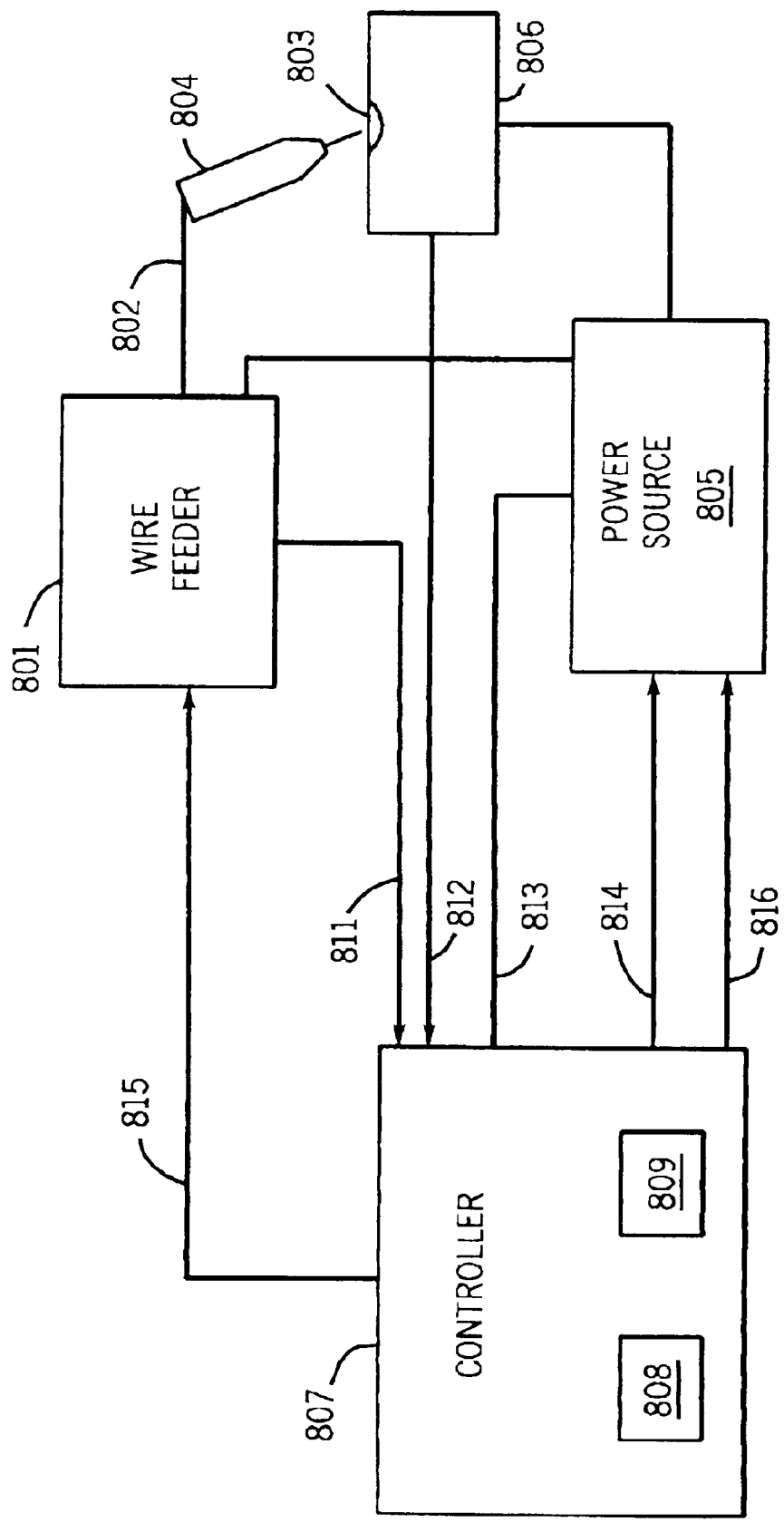
FIG. 8 is a block diagram of a MIG short circuit transfer welding system.

FIG. 8 is a block diagram of a MIG short circuit transfer welding system that implements the present invention. Generally, a wire feeder 801 provides a wire 802 through a welding torch 804 to a weldment 803. A power source 805 provides power to welding torch 804 and a workpiece 806. A controller 807 includes a microprocessor 808 (an 80196KC) microprocessor in the preferred embodiment, and a DSP or other integrated circuit in alternative embodiments), an A/D and D/A interface, and an analog circuit 809. Feedback is provided to controller 807 on lines 811–813. Control signals are provided by controller 807 on lines 814–816. Controller 807 may be part of power source 805, part of wire feeder 801, power source 805 may have a separate controller, or controller 807 may directly control the power converting of power source 605.

The preferred control scheme uses a current command signal to drive the output current. The command signal is comprised of multiple components. One component sets the long-term current command level (called the long-term current command). Another component adjusts the current command on a real-time or short-by-short basis (called the short-by-short current command).

Arc voltage feedback is used to determine if the desired arc length is present and to adjust the long-term command. The short-by-short current command is derived from real-time arc current feedback (rather than power) and is used to control the burn-off rate by an instantaneous, or short-by-short, adjustment of the current command.

The preferred control scheme also uses a function of the time derivative of arc power (less the time derivative of arc current) to detect, in real time, when the short is about to clear.

A stop algorithm is employed that monitors the arc on a short-by-short basis. When the process is ending a very low current level is provided to avoid forming a ball. However, if a short is created, (indicated by a drop in arc voltage) after the low current level, a burst of energy is provided to clear of the short. After the short is cleared, very low current is again provided to avoid forming a large ball. This is repeated until the wire stops and the process ends.

The preferred embodiment uses a power source which has the capability to change its' output current very rapidly, on the order of 1000 amps/msec. One example of this type of power source would be an inverter power source system with a low output impedance, or a secondary switcher.

The specific power source of the preferred embodiment of this invention is a series resonant convertor, such as that described in U.S. patent application Ser. No. 08/584,412, filed Jan. 11, 1996, entitled Switchable Power Supply With Electronically Controlled Output Curve And Adaptive Hot Start, which is hereby incorporated by reference. The present invention uses a controller (described below) that controls the welding process and cooperates with the power source. The controller described below provides a command to the power source indicating the desired current magnitude. The power source includes its own controller which causes the power source to provide the desired current. The power source is controlled by an external controller (that also implements the controls described herein), in another embodiment. The series resonant convertor is preferred (but not required) because it has a very fast response to the desired current command. Other embodiments use other types of power sources, including invertors, phase controlled, and secondary switcher power sources.

The invention described herein includes algorithms implemented by microprocessor 808 and analog circuit 809. Implementing the algorithm entirely with discrete components, or entirely with a microprocessor, DSP, or other integrated circuits are alternative embodiments. The algorithms control the welding process by controlling the wire burn-off or mass deposition rate on a short circuit by short circuit basis. The wire burn-off rate is controlled by controlling the current on a short circuit-by-short circuit basis (or period-by-period basis). This short-by-short current control is combined with the current control set by arc voltage (to obtain a desired arc length). The power source and controller of the preferred embodiment are sufficiently fast to provide the desired current in much less than one weld cycle.

The short-by-short burn-off rate is controlled, in the preferred embodiment, based on arc current feedback. Arc voltage is not used, in the preferred embodiment, to control the short-by-short burn-off rate because wire burn off-rate is dependent on arc current rather than arc voltage.

Thus, two control loops are in simultaneous use an arc length loop using arc voltage as feedback to set a long-term current command, and a wire burn-off loop using arc current as feedback to set a short-by-short command. The two loops are weighted differently in the preferred embodiment. Both arc voltage and arc current are used to detect, in real time, the short-clearing, and to terminate the process, as described below.

It is easiest to understand the circuitry and algorithm used to implement the preferred embodiment by referring first to typical output voltage and current waveforms, such as those depicted in FIG. 1. The dashed lines indicate time segments which are referred to as $T_{back}$ in $T_{wet}$, $T_{rise1}$, $T_{rise2}$, $T_{dpdt}$, and $T_{hld}$. These time segments indicate when, in the current waveform, changes are effected by the algorithm.

$T_{hld}$ is an arc condition that begins at the end of the short clearing. The current is commanded to a level high enough to melt the end of the wire during $T_{hld}$. $T_{hld}$ is maintained for a duration long enough that a desired amount of heat (or energy) is input into the wire. When $T_{hld}$ ends, $T_{back}$ begins.

$T_{back}$ is a steady state arc condition. During $T_{back}$ the current is at a background level, $A_{bk}$, which is sufficient to sustain an arc. However, the background current is not of a sufficient magnitude to continue to melt the wire faster than the rate at which it is being fed into the weldment. The arc condition with a low background current ends when the tip of the wire makes contact with the weld puddle, which is denoted by the end of $T_{back}$ and the beginning of the $T_{wet}$ time. If the short does not occur during $T_{back}$ after a certain length of time, the current is lowered to an even lower background level to make sure that eventually a short will occur.

The end of the arc condition is also the beginning of the short circuit condition. This transition causes an abrupt drop in the output voltage. The algorithm of the preferred embodiment sets the beginning of the short as the time at which the output voltage crosses a threshold, $V_{sht}$. The threshold is set by a comparator that receives a voltage feedback signal and provides its output to controller 807. The threshold may vary depending upon wire feed speed, wire size and type, and/or other weld parameters.

The inventors have discovered that a high current level at the inception of a short circuit may cause a "whisker short". A "whisker short" is a short circuit of abnormally short duration because the initial contact point between the wire and puddle is not sufficient to handle the current magnitude (i.e. it acts almost like a fuse that blows). Thus, the current is normally decreased at the start of each short circuit, in the preferred embodiment. Alternative embodiments do not use the temporary decrease in current.

The decrease is accomplished by microprocessor 808 changing the current command by a factor of Dip % at the onset of the short circuit (i.e. the beginning of $T_{wet}$). Thus, the current command during $T_{wet}$ (called $A_{wet}$) is defined as $A_{wet}=A_{bk}*$Dip %. Dip % is typically less than one (and as low as zero) to insure that the molten metal on the end of the wire wets into the puddle. However, DIP % can also be greater than one, and can be dependent on the wire feed speed. The lowered ($A_{wet}$) current level is maintained for the period called $T_{WET}$ to insure the molten material on the end of the wire transfers into the puddle.

The duration of $T_{wet}$ is dependent upon the size of the molten ball and is therefore dependent on wire feed speed. Also, changes in the contact tip to work distances induced by the operator in a semi-automatic operating mode can cause variations in the size of the molten ball from one short circuit sequence to the next. Thus, the duration of $T_{wet}$ is responsive to wire feed speed and operator movement.

The inventors have learned that, generally, the size of the molten ball may be correlated to the duration of the prior arc time. The longer a given arc lasts, the greater the amount of wire melted which must be transferred during the next short circuit. Microprocessor 808 monitors the time of each arc and compares that time to a preset nominal arc time. The difference between the two values is used to effect a change in the length of $T_{WET}$. More specifically, according to the preferred embodiment, if a given arc sequence exceeds the preset nominal value, then $T_{WET}$ is increased by an amount proportional to the difference between them. The algorithm defines $T_{WETNew}$ as $T_{WETOld}+$WETtGain$*(T_{arcset}-T_{arcactual})$.

Figure 3:
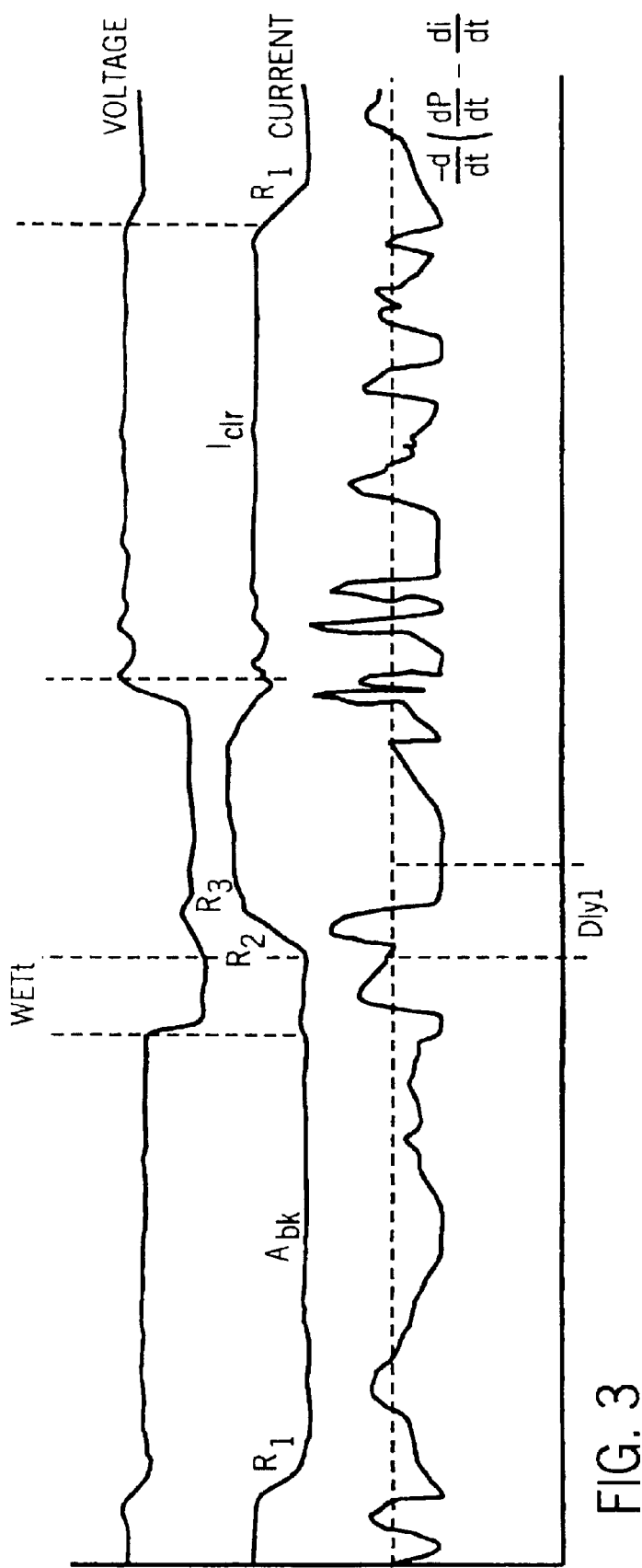
FIG. 3 is a graph showing current and voltage outputs, and a feedback signal created by the circuits of FIGS. 2A and 2B.

When $T_{WET}$ is completed the current is commanded to increase. This portion of the current waveform is called $T_{RISE1}$. The rate of rise, $R_2$ amps/msec is shown in FIG. 3, which shows current and voltage signals. $R_2$ is controlled by microprocessor 808 and can vary with wire feed speed. $R_2$ is selected to be a rate that insures the current level approaches the value necessary to initiate the necking of the molten interface between the wire and the weld puddle within the time required for transfer of the molten ball through surface tension effects.

The necking of the interface refers to the molten column achieving a cross-sectional area smaller than the nominal cross-sectional area of the solid wire. This necking is a function of both surface tension forces and the Lorentz force through which further reduction of the area is produced by the magnetic field which accompanies the current flow through this interface region.

The current magnitude increases (at the $R_2$ rate) until the current is commanded to a level L. Upon reaching this level, controller 807 commands a current rise at a rate of $R_3$, which is less than $R_2$. This rate of current rise is maintained until controller 807 determines the short is about to clear. The event of clearing the short, i.e., the transition from a short circuit to an arc, may be the most violent portion of the process and can produce the majority of spatter.

The explosive nature of this event is reduced, in the preferred embodiment, by lowering the magnitude of the current prior to or at the short clearing, thereby limiting the power density. Early detection of the necking action is beneficial because the current level can then be reduced prior to the short clearing, thereby reducing spatter. Also, the consistency with which the short clearing can be anticipated is important to effectively reduce spatter.

The present invention uses more information than can be obtained from the voltage waveform alone to quickly and consistently detect the necking action. The interface between the wire and the puddle is used to detect the imminent short clearing. This is a region of high power density due to the high current levels and the relatively small cross sectional area. The resistance of the interface region begins to rise as the necking occurs and the cross sectional area decreases. This increase in resistance will cause a corresponding increase in the power density in this region. Power=$I^2*R$ and R=(resistivity*dl/Pi*$r^2$) where dl is the length of the necking region and r is the radius of the necking region. Thus, as the radius of the necking region approaches zero, the power density approaches infinity.

Controller 807 uses, in one embodiment of the invention, the 1st derivative of the power, dP/dt, to detect the short clearing event, in real time. However, the current rise during the time $T_{RISE1}$ may cause the power derivative hardware to attain the maximum output voltage level and stay there for a period of time. The slow recovery of the hardware circuit makes the detection of a given threshold voltage indicating the progression of the necking event difficult.

This problem is solved in another embodiment by subtracting a properly scaled quantity related to the time rate of change of current. The signal used to detect the necking action is a control circuit voltage $V_c$ as implemented by the hardware of the preferred embodiment. $V_c$ is a calculated value and could be derived using a digital circuit. This signal is $V_c=(k_1 dP/dt-k_2*di/dt)$ (where $k_1$ and $k_2$ are scalars). Controller 807 determines that the necking has begun when $V_c$ rises above a level, $V_{threshold}$. $V_{threshold}$ is a threshold that may vary with weld conditions such as, for example, wire feed speed, wire type or wire size.

Using the scaled subtraction reduces the swing in $V_c$ so that $V_c$ does not saturate the hardware. Microprocessor 808 is enabled to accept the comparator signal indicating that $V_{Threshold}$ had been reached in one embodiment. However, $V_c$ is still greater than $V_{threshold}$ during the $T_{wet}$ time and shortly thereafter. Thus, controller 807 does not sense the comparator output until after a delay, $Dly_1$, from the beginning of $T_{Rise}$. The delay is adjustable depending upon the welding condition. An alternative embodiment uses a different scaling and different hardware (without the scaled subtraction).

The embodiments described above work much better than the prior art, but in accordance with the preferred embodiment an even earlier detection of the short clearing is provided. Controller 807, in the preferred embodiment, determines the derivative of the entire quantity defined above. Thus, in the preferred embodiment $V_c=d/dt(dP/dt-a*di/dt)$, and is plotted in FIG. 3. Again, when $V_c$ crosses $V_{threshold}$ controller 807 determines, in real time, that the short is about to clear. Alternatives includes other functions of dP/dt, using functions of $dV_c/dt$ instead of or with dP/dt, as well as using dR/dt, or higher order derivatives of these parameters, or other functions of these parameters, and combinations thereof.

Voltage and current feedback signals are used to obtain a power feedback signal. The voltage feedback is obtained from the gun head to the ground clamp on the work piece in the preferred embodiment. Current feedback is preferably sensed using a current transducer, such as a LEM, in series with the current output, but located in the power source. Other feedback locations may be used.

Figure 2A:
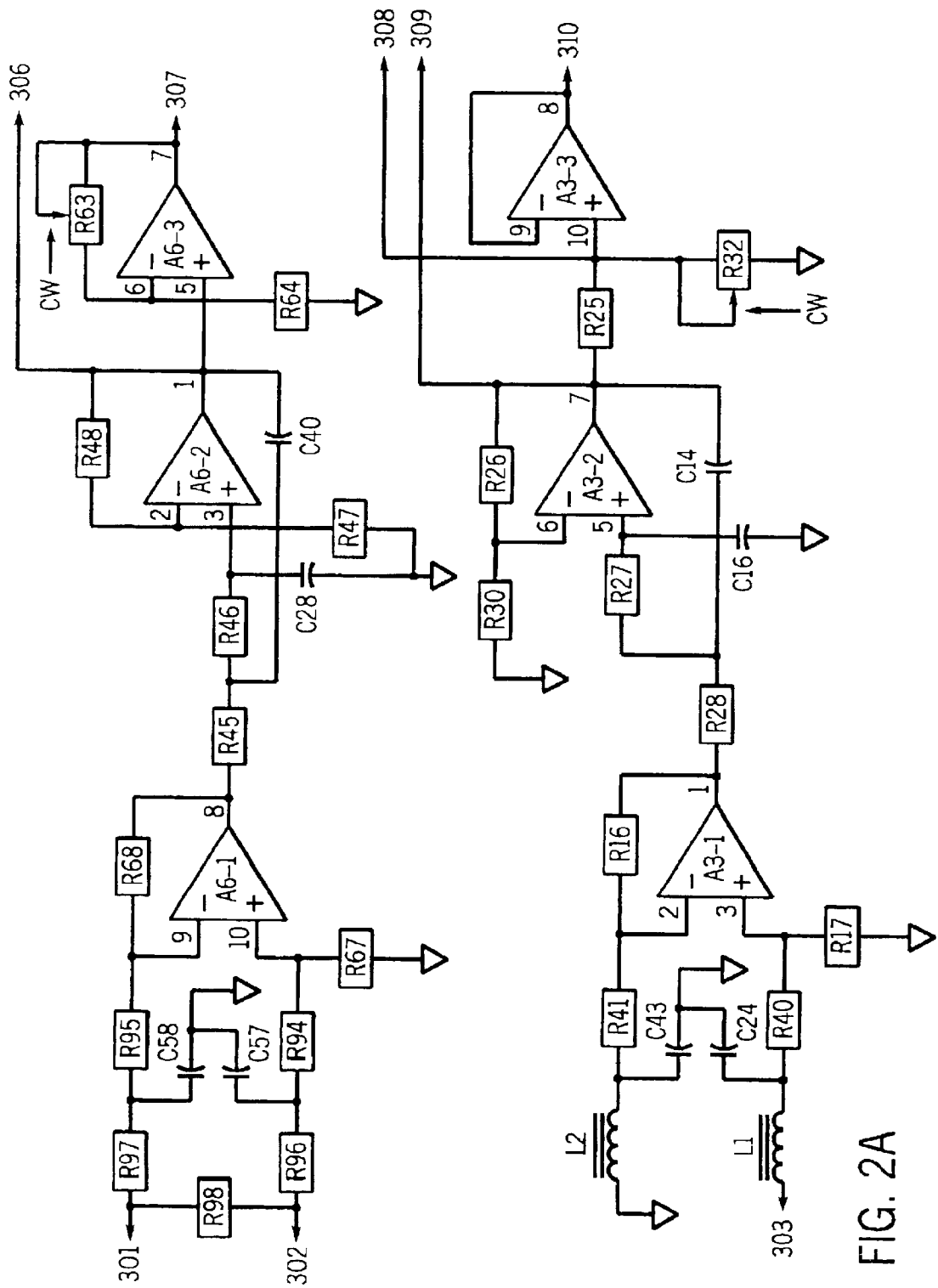
FIGS. 2A and 2B are circuit diagrams showing part of a controller that determines when the short is about to clear.
Figure 2B:
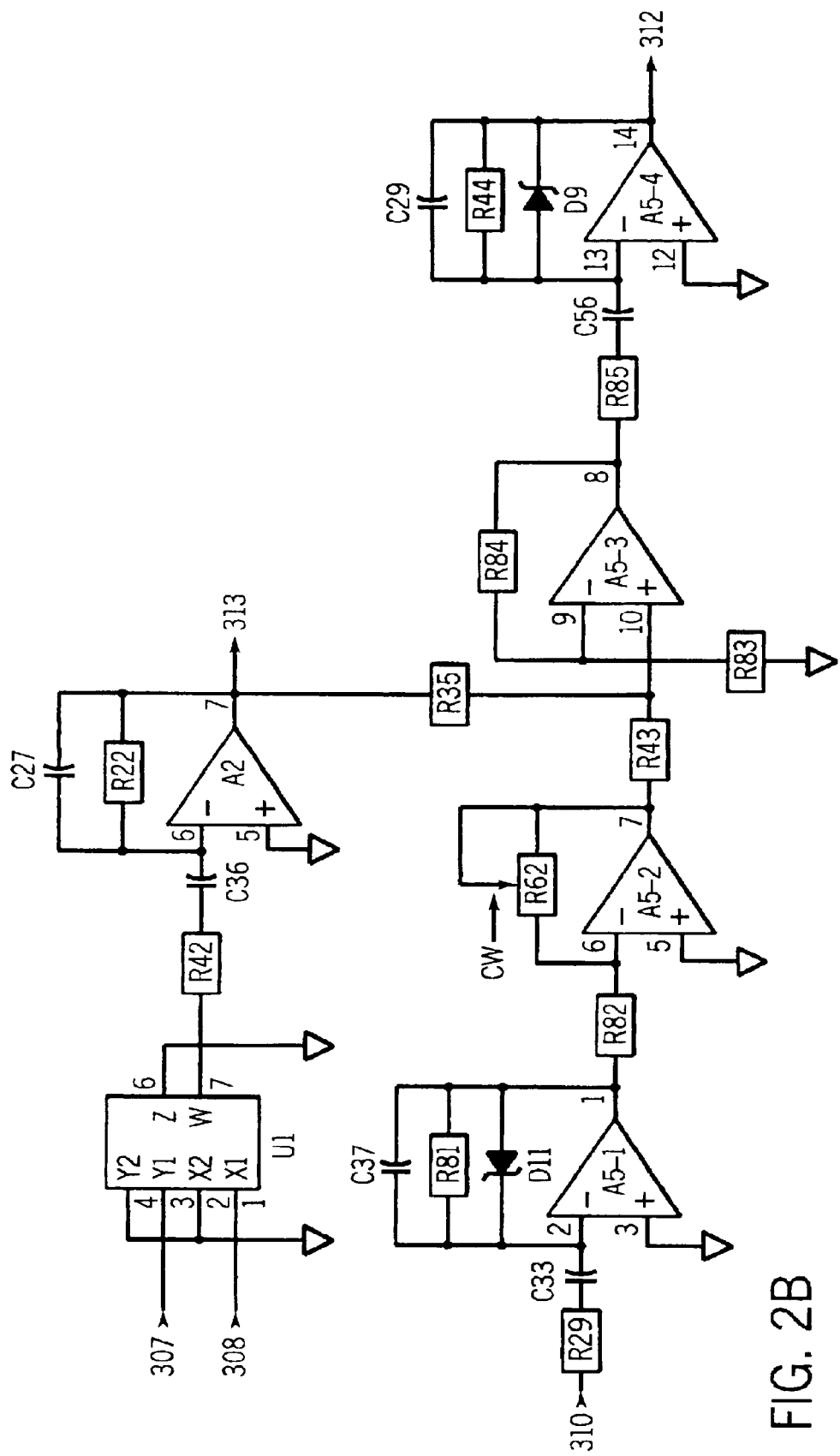

Referring now to FIGS. 2A and 2B, a portion of analog circuit 809 which is used to generate the signal "$V_c$," used by microprocessor 808 to determine when the short is about to clear is shown. The arc voltage is provided to lines 301 and 302. The arc voltage is scaled and pre-filtered by op amp A6-1, and the associated circuitry, resistors R94 and R95 (200 K ohms), R96 and R97 (0 ohms), R98 (10 K ohms), R67 and R68 (10 K ohms) and capacitors C57 and C58 (0.001 μF). The voltage signal is further filtered and scaled by an op-amp A6-2 and resistors R45 (11 K ohms), R46 (33.2 K ohms), R47 and R48 (10 K ohms), and capacitors C28 and C40 (0.001 μF). This provides a low noise signal of 1 volt/10 arc volts. The magnitude of the voltage signal is adjusted by an op-amp A6-3 and gain resistors R64 (10 K ohms) and R63 (0–500 K ohms). This signal is provided on line 307 to a multiplier stage (described below with reference to FIG. 2B).

Similarly, a current feedback signal is received on line 303, where 1 volt corresponds to 100 amps. The current signal is scaled and pre-filtered by op amp A3-1 and its associated circuitry, resistors R16 (10 K ohms), R17 (10 K ohms), R40 and R41 (20 K ohms), inductors L1 (1000 μH) and L2 (188 μH), and capacitors C24 and C23 (0.001 μF). The current signal is then further filtered and scaled by an op-amp A3-2 and its associated circuitry, resistors R26 (10 K ohms), R27 (33.2 K ohms) and R30 (10 K ohms), and capacitors C14 and C16 (0.001 μF). This provides a low noise signal of 1 volt/100 current amps. This signal is provided on line 308, to a multiplier, after scaling by resistors R25 (10 K ohms) and R32 (0–50 K ohms), which will now be described with reference to FIG. 2B.

A multiplier U1, shown on FIG. 2B, receives the voltage and current signals on lines 308 and 307, and provides an output representative of the power in the wire during the short (or at all times during which the feedback is active). The power signal is provided through a resistor R42 (1 K ohms) to an op-amp A2 configured by a pair of capacitors C36 (0.068 μF) and C27 (0.0022 μF), and a resistor R22 (51.1 K ohms) to take the derivative of the power signal (dP/dt). Thus, the output of op amp A2, provided on a line 313, is a signal representative of the derivative of the power (dP/dt) in the wire during the short (or at other times the circuit is active).

The derivative of the signal representative of the current (on line 310) is also taken. Specifically, an op amp A5-1 and associated circuitry a pair of capacitors C33 (0.068 μF), and C37 (0.0022 μF) of FIG. 2B, a resistor R81 (30.1 K ohms) and a zener diode D11 (4.7 V) are configured such that the output of op amp A5-1 is a signal representative of the first derivative of current (di/dt) in the wire during a short (or at other times the circuit is active). The current derivative signal is scaled using an op amp A5-2 and a plurality of scaling resistors R82 (10 K ohms), and R62 (0–50 K ohms).

The signals representative of the derivative of power and derivative of current are provided to op amp A5-3 through a resistor R35 (10 K ohms) and resistor R43 (10 K ohms), respectively. Op amp A5-3 is configured by a pair of resistors R84 (10 K ohms) and R83 (10 K ohms) to provide an output representative of the difference between the derivative of the power and the derivative of the current (dP/dt−a*di/dt) during a short (or at any time the feedback is active).

Finally, this difference is provided to an op amp A5-4 which is configured by a pair of capacitors C29 (330 p F) and C56 (0.022 μF), resistors R44 (100 K ohms) and R85 (1 K ohms) and a zener diode D9 (4.7 V) to take a derivative. A diode and a 100 K ohm resistor on the output of A5-4 prevent the output from going negative. Thus, the signal on a line 312 is representative of the derivative of the difference between the derivative of the power and the derivative of the current during a short ($V_c=d/dt(dP/dt-a*di/dt)$). This is the signal compared to the threshold $V_{Threshold}$. $V_{Threshold}$ is a value set by microprocessor 808, and, in the preferred embodiment, varies depending on wire feed speed, wire size or type, or other parameters.

A plot of the signal on line 312 is shown in FIG. 3, along with the arc current and voltage. $V_{threshold}$ is shown as a dashed line. The short begins when the voltage abruptly drops. The controller determines that the short is about to clear when d/dt(dP/dt−a*di/dt) crosses the dashed line ($V_{threshold}$). Thus, a technique for detecting when the short is about to clear, by identifying a parameter that occurs at a predictable time prior to the short clearing, is disclosed.

Most welders have an output stabilizer. The relatively large inductance of a typical output stabilizer will "slow" the decay of the current output, such that even if the current is commanded to low level when the short is about to clear, the actual output current does not sufficiently reduce prior to the short clearing. Thus, one aspect of the invention includes an "active" output stabilizer to help bring down the output current quickly after the detection of the short clearing.

Figure 9:
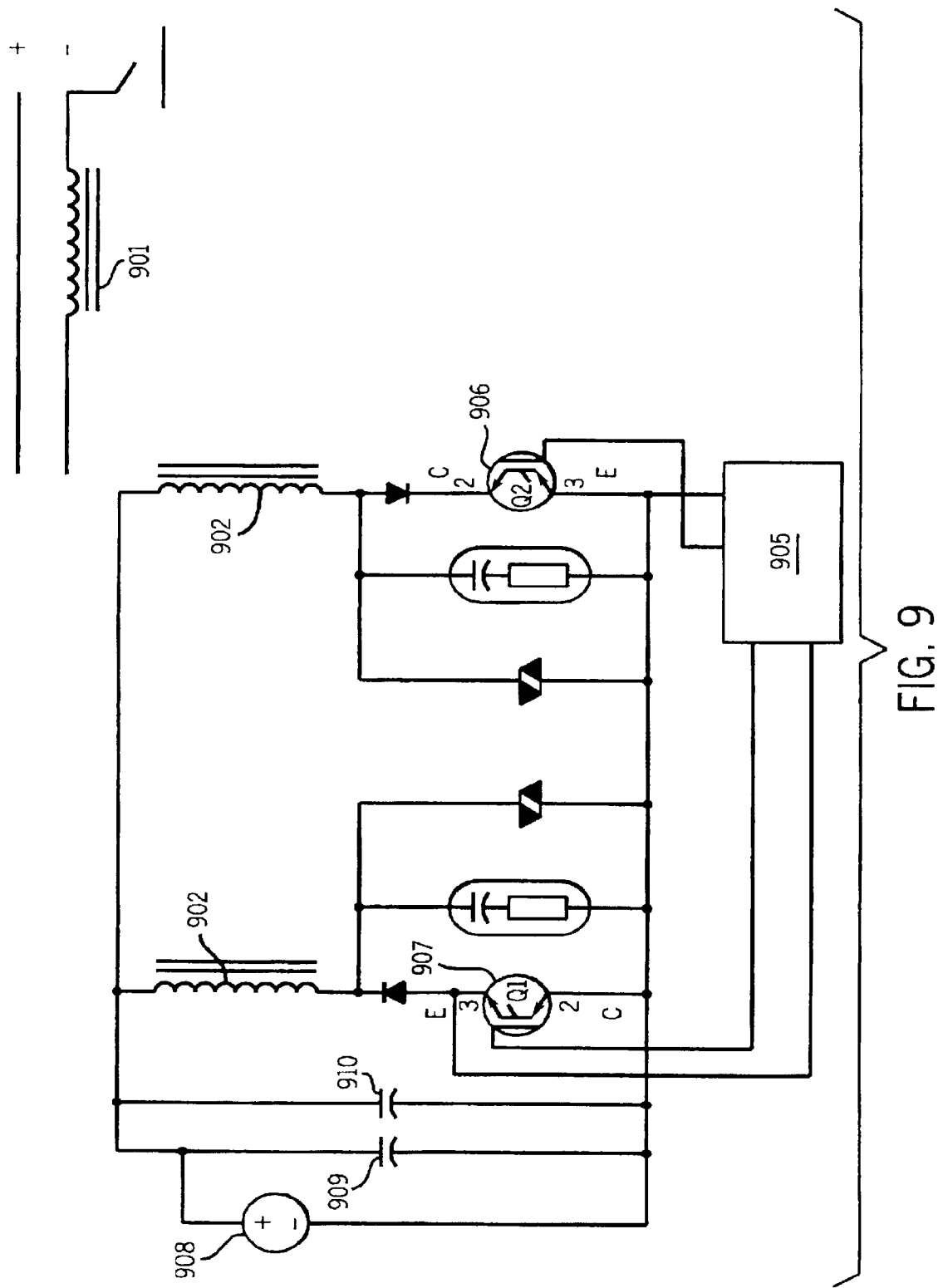
FIG. 9 is a circuit diagram of an active stabilizer used in the preferred embodiment.

Generally, as shown in FIG. 9, the active stabilizer includes an output stabilizer 901 and a pair of coils 902 wound on a common core with main stabilizer 901. A pair of switches 906 and 907 are in series with each of coils 902, along with a pair of diodes. A dc source 908, and a pair of capacitors 909 and 910 are connected across coils 902 and switches 906 and 907. Switches 906 and 907 are controlled by a controller 905 such that current flows in coils 902 to create a flux opposing the flux created by the output current. This reverses, in part or completely, the field in stabilizer 901, and the output current quickly decreases. The active stabilizer is fired by controller 905 after the dP/dt circuit determines that the short is about to clear or is clearing. Thus, the output current quickly drops when the short clearing is detected.

While the present invention provides for much better short-clearing detection than the prior art, it is still possible that either a short clearing not detected, or the detection is a false positive. Accordingly, a safety net is provided in the event that the dP/dt detection of the short about to clear doesn't work properly.

When the dP/dt circuit detects a short the active stabilizer is fired, the current is reduced, the dP/dt detection circuit is reset, and the output voltage is monitored to determine if the short actually clears. If, after a predetermined length of time, the short does not clear (indicated by the arc voltage failing to cross a threshold) then a current command is provided that causes the current to rise at a fixed rate to a value which is intended to clear the short. Subsequent clear ramps may have faster rising current commands. Also, because the dP/dt circuit was reset, the dP/dt is still compared to a threshold to detect when the short is about to clear. However, the threshold is increased for the subsequent comparisons to compensate for the increased current from the ramp-up in the power level. If the new threshold is crossed, the commands above are repeated. Thus, a safety net for false positives is provided.

Protection against a failure to detect a short clearing is also provided. The arc voltage is monitored, and if the arc voltage indicates that a short has cleared then controller 807 advances the current command to the next portion of the waveform.

As described above, another aspect of this invention is the ability to control the arc length. This helps the short circuit transfer process be consistently stable. The preferred embodiment uses arc voltage to control arc length because there is a direct correlation between arc length and arc voltage. Generally, the arc voltage is compared to a setpoint. The arc length is determined to be more or less than a desired length based on whether the arc voltage is more or less than the setpoint.

Also, a feedback relating to heat input to the wire, which corresponds to burn-off rate, is derived from a current feedback signal. The interaction of the two feedback loops—voltage for arc length and current for burn-off rate provides this control scheme with a stable arc.

Figure 4A:
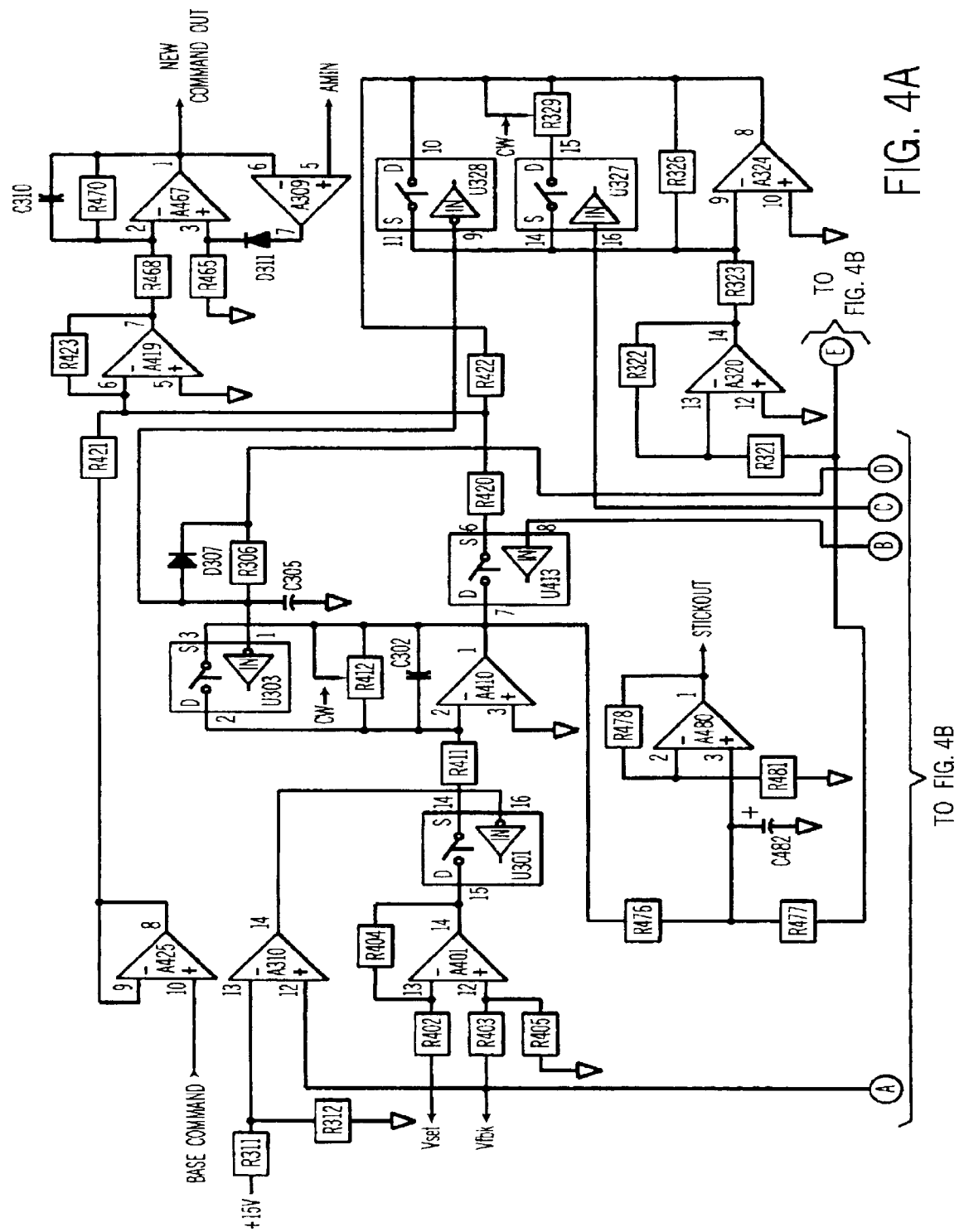
FIG. 4 is circuit diagram showing part of a controller that sets the current command.
Figure 4B:
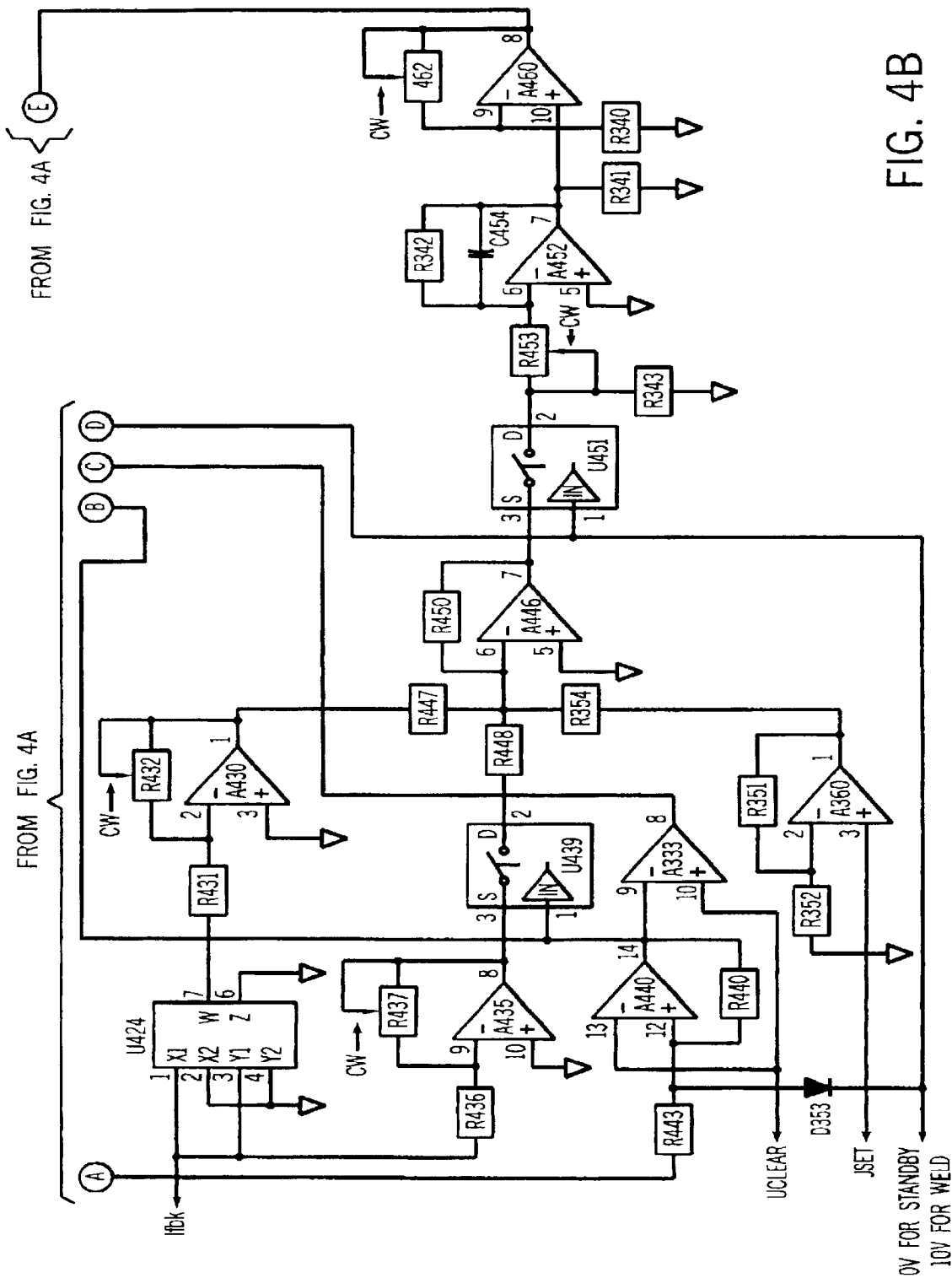

The specific output circuitry that performs the arc length control is shown in FIG. 4. Instantaneous voltage feedback ($V_{fbk}$) and a voltage setpoint ($V_{set}$) are provided to a differential amplifier A401. $V_{set}$, is supplied by microprocessor 808 used to implement the control scheme. A plurality of resistors R402–R405 (100 K ohms) provide the desired gain.

The output of op-amp A401 is provided to an op-amp A410 through a switch U301. Switch U301 removes the output of op amp A401 from the input of op amp A410 when the OCV exceeds a predetermined threshold set by an op amp A310, and a pair of resistors R311 (100 K ohms) and R312 (68.1 K ohms). Op-amp A410 is configured, along with a pair of resistors R411 (1 K ohms), R412 (0–100 K ohms), a switch U303, and a capacitor C302 (6 μF) to be an integrator. Switch U303 is controlled by a capacitor C305 (1 μF), a resistor R306 (47.5 K ohms) and a diode D307 to quickly clear integrator A410.

A switch 413 is closed in an arc condition and is opened in a short condition. Switch 413, along with a switch 439, is controlled by an op amp A440. Op amp A440, along with a resistor R440 (619 K ohms), and a resistor R443 (10 K ohms) which determine when an arc or short is present. A diode D353 is used to reset the circuit in standby. Without switch 413, the voltage error from integrator A410 during an arc outage, which quickly reaches the maximum, would adversely effect the stability of the process. Thus, when an arc outage occurs, the output of op-amp A410 is effectively removed from the control circuitry.

The output of integrator A410 is provided (when switch 413 is closed) to a summing junction of an op-amp A419. A plurality of resistors R420–R423 (10 K ohms) provide the appropriate scaling. The summing junction of op-amp A419 also receives a signal indicative of a base command, which has a general form of the current shown in FIG. 3. These two inputs are used to set the long-term component of the current command. The base command is provided by microprocessor 808 through an op amp A425.

The remainder of the control circuitry will be described, below, after an explanation of the short-by-short, current feedback based, control.

A control signal derived from current feedback, which corresponds to heat input to the wire and burn-off rate, provides the short-by-short control. The short-by-short control entails monitoring of the heat input into the wire. Given certain information regarding the type of wire being consumed into the weldment, the rate at which heat must be input into the wire in order to maintain the burn-off rate is calculated.

Some prior art patents "totalize" the heat input into the weldment by integrating total power input with respect to time and comparing this total to a preset value. This requires input of both the voltage and current feedback signals for the power calculation. However, analysis of the physics involved with the melting of the wire shows that the burn-off of the wire is independent of the arc voltage. The heat input/sec into the wire is given by the following equation:

$$Q_{Wire}/\text{sec} = [(V_{anode} + W.F. + 3kT/2e)*I(t) + I^2(t)l* \rho/A], \text{ where:}$$

$V_{anode}$ = anode voltage drop
W.F. = work function of the metal
$3kT/2e$ = thermal energy of the electrons impinging on the wire
l = contact tip to arc
ρ = resistivity of the metal
A = cross sectional area of the wire
I(t) = instantaneous current It can be seen from these equations that the melting rate of the wire can be expressed in terms of I(t) only, independent of V(t). The first term of this equation applies only in the arc mode of the process, while the second term is applicable in both the arc and short circuit modes.

The amount of energy required to melt a given size and type of wire with a fixed feed rate can be determined with the following equation:

$$Q_{req} = R_{dep}*(H_m + (T_{drop} - T_{amb})*C_p)*t_{tot}, \text{ where:}$$

$R_{dep}$ = wire mass deposition rate
$H_m$ = latent heat of melting for the wire
$T_{drop}$ = temperature of the molten drop
$T_{amb}$ = ambient temperature of the wire
$C_p$ = heat capacity of the wire
$t_{tot}$ = average period of a short/arc sequence The preferred embodiment uses the arc physics to insure that the energy input required to maintain the melting of the incoming wire is supplied in a consistent manner. This means that variations of feed rate due to the operators' movements will be accounted for and the instantaneous burn-off rate will be adjusted. The circuit employed in achieving this control (implementing these equations) is shown in FIG. 4, and is part of analog circuit 809.

The current feedback signal ($I_{fbk}$) is provided on line 309 from the Bessel filter A3-2 of FIG. 2. This signal is connected to both inputs of a multiplier U424 to yield an output proportional to $I^2(t)$. The $I^2(t)$ signal is then scaled by a pair of gain setting resistors R431 (1 K ohms) and R432 (0–100 K ohms) of an amplifier A430 to produce a representation of the resistive heating in the wire. The gain of amp A430 is equated to the resistance of the wire stick out. The output of amp A430 is provided to a summing node, where it will be added to two other components.

The current feedback input, $I_{fbk}$, is also provided to an amplifier A435. Amplifier A435 has a gain set by a pair of resistors R436 (5 K ohms) and R437 (0–10 K ohms), and represents $V_{anode} + W.F. + 3kT/2e$. This is the coefficient of the arc contribution to the wire heat input in the $Q_{wire}$ equation above.

The output of amp A435 is switched into the summing node by an analog switch U439. Switch U439 insures that this portion of the heat input is provided only during an arc, and not during a short circuit. The voltage feedback signal ($V_{fbk}$) is provided to a comparator A440. Resistors R440 (619 K ohms) and R443 (10 K ohms), and using a signal from microprocessor 808 are used for the arc/no arc determination. Thus, the output of amp A435 is provided to the summing node only during an arc.

The third input to the summing node is an average required heat input or burn rate, $J_{set}$, which comes from microprocessor 808. $J_{set}$ is a predetermined value of required power input into the wire to sustain burn-off at a given feed rate. Its value is feed-rate-dependent and is adjusted by microprocessor 808 as wire feed speed is adjusted. $J_{set}$ is provided to the non-inverting input of an op amp A350, which has scaling resistors R351 (10 K ohms) and R352 (20 K ohms).

The instantaneous heat input rate, determined from the outputs of amps A430 and A435 are compared to with the required average input rate, $J_{set}$, by an amplifier A446 and a plurality of resistors R447, R448, R450, and R454 (10 K ohms).

The output of amp A446 is provided through an analog switch 451 to avoid potential start up transient problems. Switch 451 is controlled by microprocessor 808 to be closed for welding and open for standby. The instantaneous heat rate differences from amp A446 are integrated by an op amp A452, resistors R453 (0–100 K ohms), R343 (4.75 K ohms), and R342 (100 Kohms), and a capacitor C454 (6 μF). The integrated value is scaled by an op amp A460, and resistors R462 (0–100 K ohms), R340 (10 K ohms), and R341 (10 K ohms) to produce a command correction signal that adjusts the current command in an attempt to maintain constant burn-off (or mass deposition rate) of the wire. This represents a portion of the instantaneous or short-by-short control described generally above.

This correction command is provided to summing op amp A419 through resistor R422 and a pair of op amps A320 and A324. Op amp A320, and resistors R321 and R322 (10 K ohms), invert the signal. Op amp A324 has an adjustable gain controlled by a pair of switches U327 and U328, and resistors R323 (10 K ohms), R325 (10 K ohms), and R329 (0–100 K ohms). Switch U327 is controlled by an op amp A333, which opens switch U327 during an arc. Switch U328 is closed by U303 during standby. Thus, a plurality of gains are provided.

The base command is provided to op amp A419 through resistor R421, and the integrated voltage error signal is provided through resistor R420. The output of op amp A419 is provided to an op amp A467. Op amp A467, along with resistors R468 (10 K ohms), R470 (10 K ohms), and capacitor C310 (270 pF) return the modified command to its' proper polarity. A diode D311, a resistor R465 (10 K ohms) and an op amp A309 set the minimum current command output.

Another aspect of this invention is to provide an overall stability to the short arc process by controlling the pre-heating of the wire. The inventors have determined that the MIG process is intrinsically oscillatory. The oscillations are of a low frequency, typically in the range from 2 to 10 Hz. They result from the non-uniform pre-heating of the wire, which is often caused by either spot heating, or by the operator changing the arc length or stick-out length, as will be described below.

Figure 5:
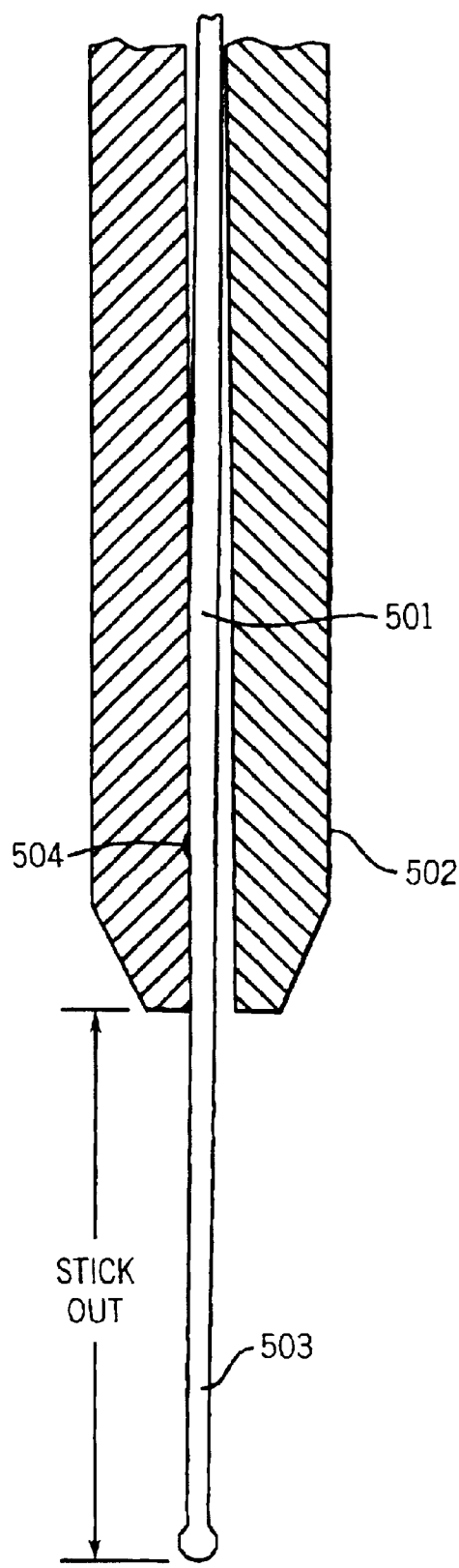
FIG. 5 is a cross sectional diagram of a contact tube and welding wire.

The current is transferred to a welding wire 501 through a dynamic interface within a contact tube 502 as shown in FIG. 5 in most MIG welding systems. A contact area 504 is a high current density region due to the relatively small area of current flow. This high current density region has the potential to cause spot heating in the wire.

Also, problems can arise if there is a perturbation in the process which causes a period of higher current to flow into the wire. For example, operator movement can momentarily increase the wire delivery rate and thereby requires additional current to melt the wire. When additional current is provided a hot spot in the wire is produced. This spot heating causes the resistance in that particular portion of the wire to increase. This increased resistance further enhances the $I^2*R$ heat input into the wire in that region as current continues to flow in subsequent short circuit and arc sequences. The end result is an area of localized heating in the wire. When this area reaches the weld puddle, the amount of wire which is melted following a short circuit will be greater than usual.

The wire can melt back excessively in extreme cases, and result in a flare-up of the arc which is detectable to the operator. This flaring detracts from the overall stability of the process and is undesirable. Furthermore, the long arc time caused by spot heating, results in a long transit time of the wire-back to the puddle. During this transit time, the current is low, ($A_{bk}$) and therefore, the $I^2*R$ heating at the contact area in the contact tube is low. This produces a relative cold spot in the wire which begins to travel toward the puddle. As this cold region of wire approaches the weld puddle, the size of the molten ball formed after the short clears, decreases. Also, the time spent in the arc mode decreases. This shift in time from the arc to short circuit increases the overall $I^2*R$ heating of the wire. This increased $I^2*R$ heating produces a localized hot spot in the wire near the contact tube, bringing the cycle back to the beginning. Thus, this process may be cyclic in nature.

Figure 6:
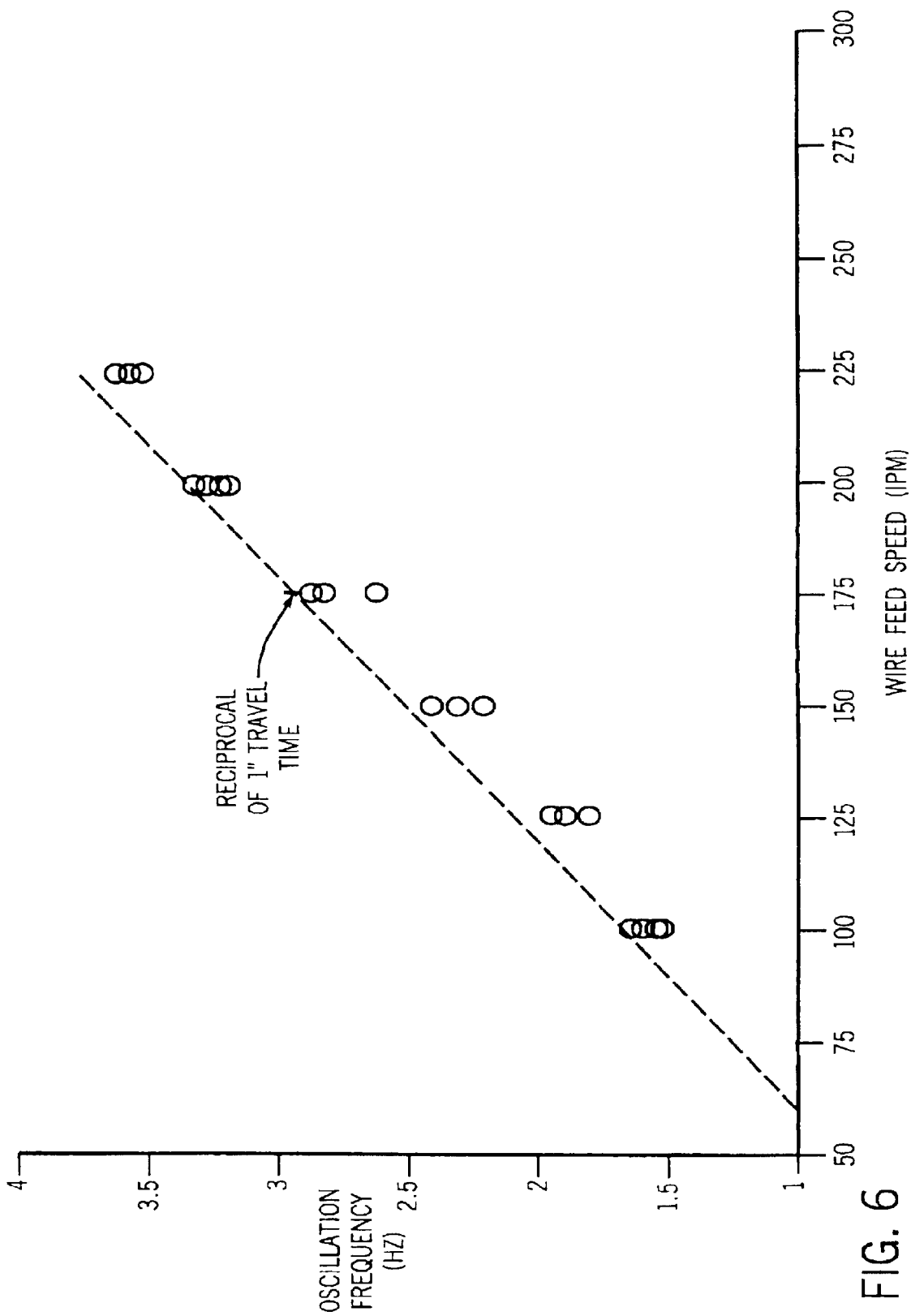
FIG. 6 is a graph showing wire feed speed and oscillation frequency for a MIG short circuit transfer welding system.

The frequency of this cyclic phenomenon is related to a number of factors. Chief among these are the stick out length (503 of FIG. 5) and wire feed speed. The fundamental frequency of oscillation is represented by the inverse of the transit time of a section of wire equal to the length of the stick out, traveling at a velocity equal to the wire feed speed. Data demonstrating this relationship for a 1" stick out is shown in FIG. 6. It should be noted that higher modes of this fundamental frequency could conceivably be excited.

Prior art short circuit control algorithms generally cannot adjust for such "pre-heating" until it changes the arc voltage/arc length. However, by the time the problem manifests itself in this manner, it is too late to change the result. Thus, advanced knowledge of the heat input into the end of the wire is used to compensate for variations in pre-heating portions of the wire.

The power input into the arc can be regulated properly to avoid the flaring and stubbing cycles if the state of the wire which will be exposed to the arc is known. The state of the end of the wire can be determined from its current carrying history. Information regarding the stick out length is used so that one can go back in time the proper distance to correctly ascertain how much current a segment of wire (i.e., a small linear portion of the wire) has carried.

The length of stick out is determined by summing the output from voltage error integrator A410 through a resistor R476 (10 K ohms) with the output of $J_{set}$ error op amp A460 through a resistor R477 (10 K ohms) by an op-amp A480, including a resistor R478 (20 K ohms), a resistor R481 (10 K ohms), and a capacitor C482 (5.6 μF).

The output of op amp A480 generates a relatively linear function when plotted with stick out as the independent variable. The inverse function yields a linear relationship between the output of op amp A480 and the actual wire stick out in units of length. The slope and intercept of this line can be stored in microprocessor 808 for a given wire size, type, feed speed, etc. Thus, all the information needed to determine the wire stick out is available to microprocessor 808 for a given welding condition.

Figure 7:
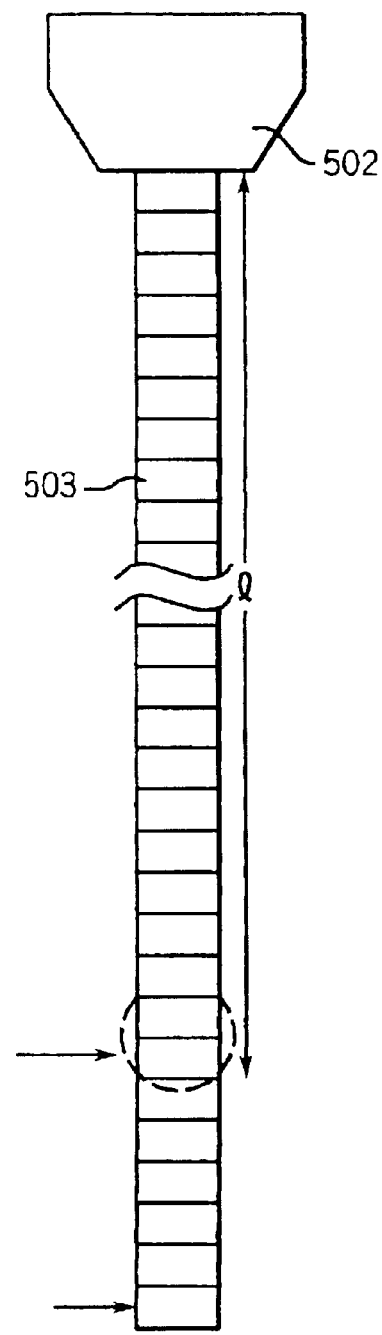
FIG. 7 is sectional diagram of the stick out portion of a welding wire used in a MIG short circuit transfer welding system.

The heat input into the wire is determined by treating the wire stick out as a series of small segments (see FIG. 7). The $I^2*R$ heat input into each segment is found by taking multiple samples of the $I^2*R$ output at amp A430 and summing these over a duration of time less than the short-arc period (cycle process). This sum then represents the heat input into each segment along the stick out. An array stores the heat input information so that a cumulative sum is maintained for each segment. The segment which contains the heat input information for the end of the wire is determined by going back in time an amount based upon the stick out, as measured by the output of op amp A480. The magnitude of the sum of the wire end segment is used, in this embodiment, to determine the amplitude of the current level during the arc time. The sum is compared to a predetermined heat level and the magnitude of the current during the arc is increased or decreased in proportion to the error present. Other aspects of the current waveform, such as Hldt, rate of rise, or $R_1$, could be utilized to control the arc heat input based upon the heat at the end of wire in other embodiments.

Another aspect of this invention is providing a stop algorithm that doesn't allow the formation of a large ball at the end of the wire. This is accomplished using microprocessor 808. Specifically, a stop signal is received by microprocessor 808 (for example, when the user ends the process). Microprocessor 808 then commands the motor to come to a stop. Feedback from wire feeder 801, derived from a tachometer, allows the microprocessor to determine the wire feed speed. Microprocessor 808 commands a low CV command until a predetermined wire feed speed is reached (about 200 IPM in the preferred embodiment). Alternatively, after receiving the stop command the process parameters are ramped down until the wire feed reaches 75 IPM. When the predetermined wire feed speed is reached controller 807 sends special current commands to the power source.

Controller 807 monitors the arc voltage, and when a short is detected (indicated by a drop in arc voltage) a rising current is commanded (similar to the response of the normal welding process). When the arc voltage reaches the predetermined threshold (indicating that the short has cleared) the rising current command is terminated, and very low current (about 0–10 amps in the preferred embodiment) is commanded. With very low current, very little ball formation occurs. Thus, if the wire does not advance further, and does not touch the puddle, a large ball is not formed on the end of the wire.

If, however, the wire continues to advance and touches the puddle, or the puddle flows back and touches, the routine is repeated, and again, a large ball is not left on the wire. This algorithm continues to repeat until the wire stops, and a large ball is not formed. It should be noted that this algorithm does not consume much wire since large balls are not formed. Therefore, this process cannot be activated until very little wire advancement is expected.

The voltages used to determine if the wire is shorted or not are referenced to the current flowing through the wire in the preferred embodiment. Thus, if a medium voltage level is detected and the selected current magnitude is low, then the short has cleared. However, that same arc voltage at a high selected current level might indicate the short still exists, and that the wire is merely getting hot. Thus, the voltage threshold is adjusted by microprocessor 808 based on the selected current level.

One alternative is to provide a stop signal to power source 805 from microprocessor 808 that overrides a minimum current setting during the stopping time (the minimum current is set for a number of low current applications where the arc is in danger of being extinguished). Then controller 807 allows the power source to continue to do its constant voltage (CV) control, but commands a much lower voltage and the arc time current would naturally be less. Other alternatives include controlling the braking of the wire feed motor, along with the electrical output of the power source.

This aspect of the invention is readily adapted to processes other than short circuit transfer welding, such as an arc spray process, and with other control schemes.

The algorithm for stopping is also disclosed in a U.S. Patent Application entitled Method and Apparatus for Stopping a Welding Process, filed on even date herewith by Holverson and Mehn, and assigned to the owners of this application, which is hereby incorporated by reference.

Numerous modifications may be made to the present invention which still fall within the intended scope hereof. Thus, it should be apparent that there has been provided in accordance with the present invention method and apparatus for short circuit transfer welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for welding by depositing drops of molten metal at the end of a consumable welding wire into a weld puddle comprising:
   a power source having a current output in electrical communication with the welding wire;
   feedback means for providing a signal indicative of a stick out length in response to a frequency of the output; and
   a controller means, coupled to the power source and having a feedback input coupled to the feedback means, for determining the stick out in response to the frequency and for controlling the magnitude of the current provided to the welding wire in response to the stick out length.

2. The apparatus of claim 1, further including power feedback means for providing a signal indicative of the output power wherein the means for controlling includes means for determining a rate of change of the output power.

3. The apparatus of claim 2 wherein the means for controlling includes means for determining a value $V_c$ defined by $V_c=k*(dp/dt)$, wherein k is a scalar and dp/dt is the derivative of the power, and wherein the controller includes means for comparing $V_c$ to a threshold.

4. The apparatus of claim 3 wherein the threshold is dependent on at least one of wire feed speed, wire size, or wire type.

5. The apparatus of claim 2 wherein the means for controlling includes means for subtracting a value responsive to the rate of change of the output current from the rate of change of the output power.

6. The apparatus of claim 5 wherein the means for controlling includes means for taking the derivative of a value responsive to the rate of change of the output power less the value responsive to the rate of change of the output current.

7. The apparatus of claim 6 wherein the means for controlling includes means for determining a value $V_c$ defined by $V_c=d/dt(k1*dp/dt-k2*di/dt)$, wherein k1 is a scalar, dp/dt is the derivative of the output power, k2 is a scalar, and di/dt is the derivative of the output current, and wherein the controller includes means for comparing $V_c$ to a threshold.

8. The apparatus of claim 7 wherein the means for controlling further includes means for summing over time a difference between the voltage signal and a voltage setpoint when an arc exists, and means for controlling the current in response to that sum, whereby the arc length is controlled to a desired length.

9. The apparatus of claim 8 wherein the means for controlling includes means for providing a desired mass deposition rate responsive to a wire feed speed and a distance from a tip of the wire to the workpiece.

10. The apparatus of claim 8 wherein the means for controlling includes means for comparing a value responsive to the energy needed to melt a given amount of wire to a value representing the amount of energy delivered in at least a portion of one welding cycle.

11. The apparatus of claim 10 wherein the means for comparing compares a value responsive to the energy needed to melt a given amount of wire to a value representing the amount of energy delivered in one complete welding cycle.

12. The apparatus of claim 11 wherein the means for controlling includes means for determining the energy needed in accordance with $Q_{req}=k3*(R_{dep}*(H_m+T_{crop}-T_{amb})*C_p)*t_{tot})$, where $Q_{req}$ is the energy needed, k3 is a scalar, $R_{dep}$ is a wire mass deposition rate, $H_m$ is a latent heat of melting for the wire, $T_{drop}$ is the temperature of the molten drop, $T_{amb}$ is the ambient temperature of the wire, $C_p$ is the heat capacity of the wire, and $t_{tot}$ is a cycle length, and the means for controlling includes means for determining the energy delivered in accordance with $Q_{wire}=((V_{anode}+WF+3kT/2e)*I+I^2*l*rho/A)$, where $Q_{wire}$ is the energy delivered, $V_{anode}$ is the anode voltage drop, WF is the work function of the metal comprising the wire, (3kT/2e) is the thermal energy of electrons impinging on the wire, I is the output current, l is the contact tip to arc distance, rho is the resistivity of the wire, and A is the cross sectional area of the wire.

13. The apparatus of claim 11 wherein the means for controlling includes means for determining a length of stick out.

14. The apparatus of claim 13 wherein the means for controlling includes means for determining the heat input to the wire and comparing the heat input to a predetermined heat level.

15. The apparatus of claim 14 wherein the means for controlling includes means for summing over time a value representative of $I^2*R$, where I is the current and R is the resistance of the wire, for a plurality of locations along the wire and for comparing the sum for the location at the end of the wire to a predetermined heat level.

16. The apparatus of claim 2 wherein the means for controlling includes means for determining a value $V_c$ defined by $V_c=k1*(dp/dt)-k2*(di/dt)$, wherein k1 is a scalar, dp/dt is the derivative of the output power, k2 is a scalar, and di/dt is the derivative of the output current, and wherein the controller includes means for comparing $V_c$ to a threshold.

17. The apparatus of claim 1 wherein the feedback mesas includes a voltage signal representative of the output voltage and the means for controlling includes mean for summing over time a difference between the voltage signal and a voltage setpoint, and means for controlling the current in response to that sum, whereby the arc length is controlled to a desired length.

18. The apparatus of claim 17 wherein the means for summing sums only over the time when an arc exists.

19. The apparatus of claim 1 wherein the means for controlling includes means for providing a desired mass deposition rate responsive to a wire feed speed and a distance from a tip of the wire to the workpiece.

20. The apparatus of claim 1 wherein the means for controlling includes means for comparing a value responsive to the energy needed to melt a given amount of wire to a value representing the amount of energy delivered in at least a portion of one welding cycle.

21. The apparatus of claim 20 wherein the means for controlling includes means for determining the energy needed in accordance with $Q_{req}=k3*(R_{dep}*(H_m=(T_{drop}-T_{amb})*C_p)*t_{tot})$, where $Q_{req}$ is the energy needed, k3 is a scalar, $R_{dep}$ is a wire mass deposition rate, $H_m$ is a latent heat of melting for the wire, $T_{drop}$ is the temperature of the molten drop, $T_{amb}$ is the ambient temperature of the wire, $C_p$ is the heat capacity of the wire, and $t_{tot}$ is a cycle length, and the means for controlling includes means for determining the energy delivered in accordance with $Q_{wire}=((V_{anode}+WF+3kT/2e)*I+I^2*l*rho/A)$, where $Q_{wire}$ is the energy delivered, $V_{anode}$ is the anode voltage drop, WF is the work function of the metal comprising the wire, (3kT/2e) is the thermal energy of electrons impinging on the wire, I is the output current, l is the contact tip to arc distance, rho is the resistivity of the wire, and A is the cross sectional area of the wire.

22. The apparatus of claim 1 wherein the means for controlling includes means for determining a length of stick out from a frequency responsive to the time spent in an arc mode and the time spent in a short mode.

23. The apparatus of claim 1 wherein the means for controlling includes means for determining the heat input to the wire and comparing the heat input to a predetermined heat level.

24. The apparatus of claim 23 wherein the means for controlling includes means for summing over time a value representative of $I^2*R$, where I is the current and R is the resistance of the wire, for a plurality of locations along the wire, and for comparing the sum for the location at the end of the wire to a predetermined heat level.

25. An apparatus for welding by depositing drops of molten metal at the end of a welding wire into a weld puddle comprising:
 a power source having a current output in electrical communication with the welding wire;
 a feedback circuit that provides a signal indicative of a length of stick out in response to a a frequency of the output; and
 a controller coupled to the power source and having a feedback input coupled to the feedback circuit, including a circuit that determines length of stick out from the frequency, and a circuit for controlling the magnitude of the current provided to the welding wire in response to the length of stick out.

26. The apparatus of claim 25 wherein the controller includes a microprocessor.

27. The apparatus of claim 25 wherein the circuits include analog circuits.

28. The apparatus of claim 25 wherein the controller includes a circuit that compares a value responsive to the energy needed to melt a given amount of wire to a value representing the amount of energy delivered in at least a portion of one welding cycle.

29. The apparatus of claim 25 wherein the controller includes a circuit that determines a length of stick out from a frequency responsive to the time spent in an arc mode and the time spent in a short mode.

30. A method of welding by depositing drops of molten metal at the end of a welding wire into a weld puddle comprising:
 providing current to the wire;
 providing feedback, in real-time, indicative of a frequency of the output; and
 determining a length of stick out in response to the frequency; and
 controlling the magnitude of the current provided to the welding wire in response to the length of stick out.

31. The method of claim 30 wherein the step of controlling includes determining a rate of change of the output power.

32. The method of claim 31 wherein the step of controlling includes determining a value $V_c$ defined by $V_c=k*(dp/dt)$, wherein k is a scalar and dp/dt is the derivative of the power, and wherein the controller compares $V_c$ to a threshold.

33. The method of claim 32 wherein the step of controlling includes subtracting a value responsive to the rate of change of the output current from the rate of change of the output power.

34. The method of claim 33 wherein the step of controlling includes determining a value $V_c$ defined by $V_c = k1*(dp/dt) - k2*di/dt$, wherein k1 is a scalar, dp/dt is the derivative of the output power, k2 is a scalar, and di/dt is the derivative of the output current.

35. The method of claim 34 wherein the step of controlling includes taking the derivative of a value responsive to the rate of change of the output power less the value responsive to the rate of change of the output current.

36. The method of claim 35 wherein the step of controlling includes determining a value $V_c$ defined by $V_c = d/dt (k1*dp/dt - k2*di/dt)$, wherein k1 is a scalar, dp/dt is the derivative of the output power, k2 is a scalar, and di/dt is the derivative of the output current.

37. The method of claim 30 wherein the step of controlling includes providing a desired mass deposition rate responsive to a wire feed speed and a distance from a tip of the wire to the workpiece.

38. The method of claim 30 wherein the step of controlling includes comparing a value responsive to the energy needed to melt a given amount of wire to a value representing the amount of energy delivered in at least a portion of one welding cycle.

39. The method of claim 38 wherein the step of controlling includes determining the energy needed in accordance with $Q_{req} = k3*(R_{dep}*(H_m + (T_{drop} - T_{amb})*C_p)*t_{tot})$, where $Q_{req}$ is the energy needed, k3 is a scalar, $R_{dep}$ is a wire mass deposition rate, $H_m$ is a latent heat of melting for the wire, $T_{drop}$ is the temperature of the molten drop, $T_{amb}$ is the ambient temperature of the wire, $C_p$ is the heat capacity of the wire, and $t_{tot}$ is a cycle length, and determines the energy delivered in accordance with $Q_{wire} = ((V_{anode} + WF + 3kT/2e)*I + I^2*l*rho/A)$, where $Q_{wire}$ is the energy delivered, $V_{anode}$ is the anode voltage drop, WF is the work function of the metal comprising the wire, (3kT/2e) is the thermal energy of electrons impinging on the wire, I is the output current, l is the contact tip to arc distance, rho is the resistivity of the wire, and A is the cross sectional area of the wire.

40. The method of claim 30 wherein the step of controlling includes determining the energy needed in accordance with $Q_{req} = k3*(R_{dep}*(H_m + (T_{drop} - T_{amb})*C_p)*t_{tot})$, where $Q_{req}$ is the energy needed, k3 is a scalar, $R_{dep}$ is a wire mass deposition rate, $H_m$ is a latent heat of welding for the wire, $T_{drop}$ is the temperature of the molten drop, $T_{amb}$ is the ambient temperature of the wire, $C_p$ is the heat capacity of the wire, and $t_{tot}$ is a cycle length, and determines the energy delivered in accordance with $Q_{wire} = ((V_{anode} + WF + 3kT/2e)*I + I^2*l*rho/A)$, where $Q_{wire}$ is the energy delivered, $V_{anode}$ is the voltage drop, WF is the work function of the metal comprising the wire, (3kT/2e) is the thermal energy of electrons impinging on the wire, I is the output current, l is the contact tip to arc distance, rho is the resistivity of the wire, and A is the cross sectional area of the wire.

41. The method of claim 30 wherein determining includes determining a length of stick out from a frequency responsive to the time spent in an arc mode and the time spent in a short mode.

42. The method of claim 30 wherein controlling includes determining the heat input to the wire and comparing the heat input to a predetermined heat level.

43. A method of determining the length of stick out from a welding output, comprising:
    monitoring a frequency of the output;
    determining stick out as a function of the frequency.

44. The method of claim 43, wherein monitoring further comprises monitoring a frequency of the output responsive to an arc time and a short time.

45. A welder with a controller for determining the length of stick out from a welding output, comprising:
    means for monitoring a frequency of the output;
    means for determining stick out as a function of the frequency.

46. The welder of claim 45, wherein the means for monitoring comprises means for monitoring a frequency of the output responsive to an arc time and a short time.

47. A welder with a controller for determining the length of stick out for a welding output, comprising:
    a feedback circuit having a feedback signal responsive to a frequency of the output;
    a stick out circuit responsive to the feedback signal.

48. The welder of claim 47, wherein the feedback frequency of the output responsive to an arc time and a short time.

* * * * *